Jan. 16, 1968 D. D. HUIZINGA ETAL 3,364,314

MAGNETIC REPERTORY DIALER TELEPHONE SET

Filed Dec. 18, 1964 4 Sheets-Sheet 1

INVENTORS D. D. HUIZINGA
T. B. PRINCE
BY
[signature]
ATTORNEY

Jan. 16, 1968 D. D. HUIZINGA ET AL 3,364,314

MAGNETIC REPERTORY DIALER TELEPHONE SET

Filed Dec. 18, 1964 4 Sheets-Sheet 2

Jan. 16, 1968 D. D. HUIZINGA ETAL 3,364,314

MAGNETIC REPERTORY DIALER TELEPHONE SET

Filed Dec. 18, 1964 4 Sheets-Sheet 3

MAGNETIC REPERTORY DIALER TELEPHONE SET

Filed Dec. 18, 1964

3,364,314

MAGNETIC REPERTORY DIALER TELEPHONE SET

Donald D. Huizinga and Terry B. Prince, Indianapolis, Ind., assignors to Bell Telephone Laboratories, Incorporated, New York, N.Y., a corporation of New York Filed Dec. 18, 1964, Ser. No. 419,517
10 Claims. (Cl. 179—90)

This invention relates to telephones employing magnetic repertory dialer mechanisms and more particularly to such mechanisms wherein coded D-C indicia of multifrequency signals are recorded for subsequent read out and translations into multifrequency transmission signals.

Repertory dialers are now well known in the art and are becoming increasingly attractive to telephone subscribers in that they greatly enhance both the convenience and speed of telephone use. Such apparatus provides for the recording of dial generated signals, typically by magnetic means, so that a subscriber may subsequently initiate the transmission of signals corresponding to a directory number by actuating a single switch or pushbutton. Any one of a variety of visual displays is employed to facilitate the selection of a desired one of the stored numbers.

An illustrative repertory dialer of the type indicated is disclosed by R. A. Miller and C. M. Taris in a copending application Ser. No. 228,581, filed Oct. 5, 1962 now Patent No. 3,243,517. Although the Miller-Taris dialer provides a basic solution for dealing with the problems posed by the use of multifrequency signals, a number of peripheral problems must also be solved to meet the rigorous requirements of commercial use. For example, repertory dialers of the multifrequency type heretofore have employed two directions of relative movement between the recording medium and the head—one direction for indexing and another for recording or reading out. Such prior art arrangements typically experience some degree of difficulty in consistently aligning the head and the recording medium with the required degree of accuracy. Additionally, undue complexity and cost is inherent in the concept, employed heretofore, of utilizing some form of detecting means for recognizing the termination of a recorded number.

Accordingly, one object of the invention is to simplify telephone magnetic repertory dialers of the type employing multifrequency signaling.

Another object of this invention is to enhance the reliability of telephone magnetic repertory dialers of the multifrequency signaling type.

An additional object is to increase the versatility of multifrequency signaling magnetic repertory dialers.

A further object is to reduce the cost of the subject type dialers.

These and other objects are achieved in accordance with the principles of the invention by a telephone repertory dialer wherein encoded indicia of multifrequency signals are recorded on a relatively elongated recording medium such as magnetic type, for example, and wherein the transducer is driven through a fixed distance longitudinally along the recording medium in both the RECORD and CALL modes irrespective of the number of digits in a particular recorded number. To align the recorded indicia of a preselected directory number with the head, means are provided in accordance with the invention, for shifting the recording medium or tape longitudinally until a desired index position is reached. Consequently, there is no requirement at any time during any mode of operation of the dialer for relative lateral movement between the head and the recording medium. With relative movement between the head and the recording medium restricted to longitudinal movement only, the problem of aligning the head with a particular recorded number is reduced substantially with a resulting reduction in crosstalk, one of the primary underlying causes for the transmission of spurious signals.

A particular aspect of the invention relates to the control of head movement. For the RECORD cycle a stepping mechanism is utilized to move the head incrementally, one step for each successive digit, thereby achieving maximum economy in the use of recording space. In the CALL mode, however, continuous read out is used, thereby avoiding any need for extreme precision in the design of the stepping mechanism.

In accordance with the invention, the rotary motion of a motor shaft is translated by a dual function cam into a first linear force for driving the head longitudinally along the tape and into a second linear force for lifting the head well clear of the tape during the return travel.

Accordingly, each of the features of the invention relates particularly to some aspect of a telephone repertory dialer utilizing multifrequency signaling.

One feature, for example, pertains to the sequential recording of binary indicia of multifrequency signals on a relatively narrow tape.

Another feature concerns the relative movement between the tape and the head which movement is restricted to a single common direction for recording, for reading out and for positioning the head in juxtaposition to the recorded magnetic indicia of a preselected directory number.

A further feature of the invention concerns an arrangement wherein the head is made to travel over a discrete preselected length of tape in both the RECORD and CALL modes irrespective of the number of digits in a particular directory number.

An additional feature of the invention involves driving the head by a stepping action in the RECORD mode and by a continuous action in the CALL mode.

Still another feature concerns driving the head through the linear motion of a slide shaft that is converted from the rotary motion of a second shaft through camming actions.

Another feature relates to the employment of camming action powered by the aforementioned rotary drive motion for separating the head and the tape when the head is returned to its index position.

The principles of the invention and additional objects and features thereof will be fully apprehended from the following detailed description of an illustrative embodiment and from the appended drawing in which.

Figure 1:
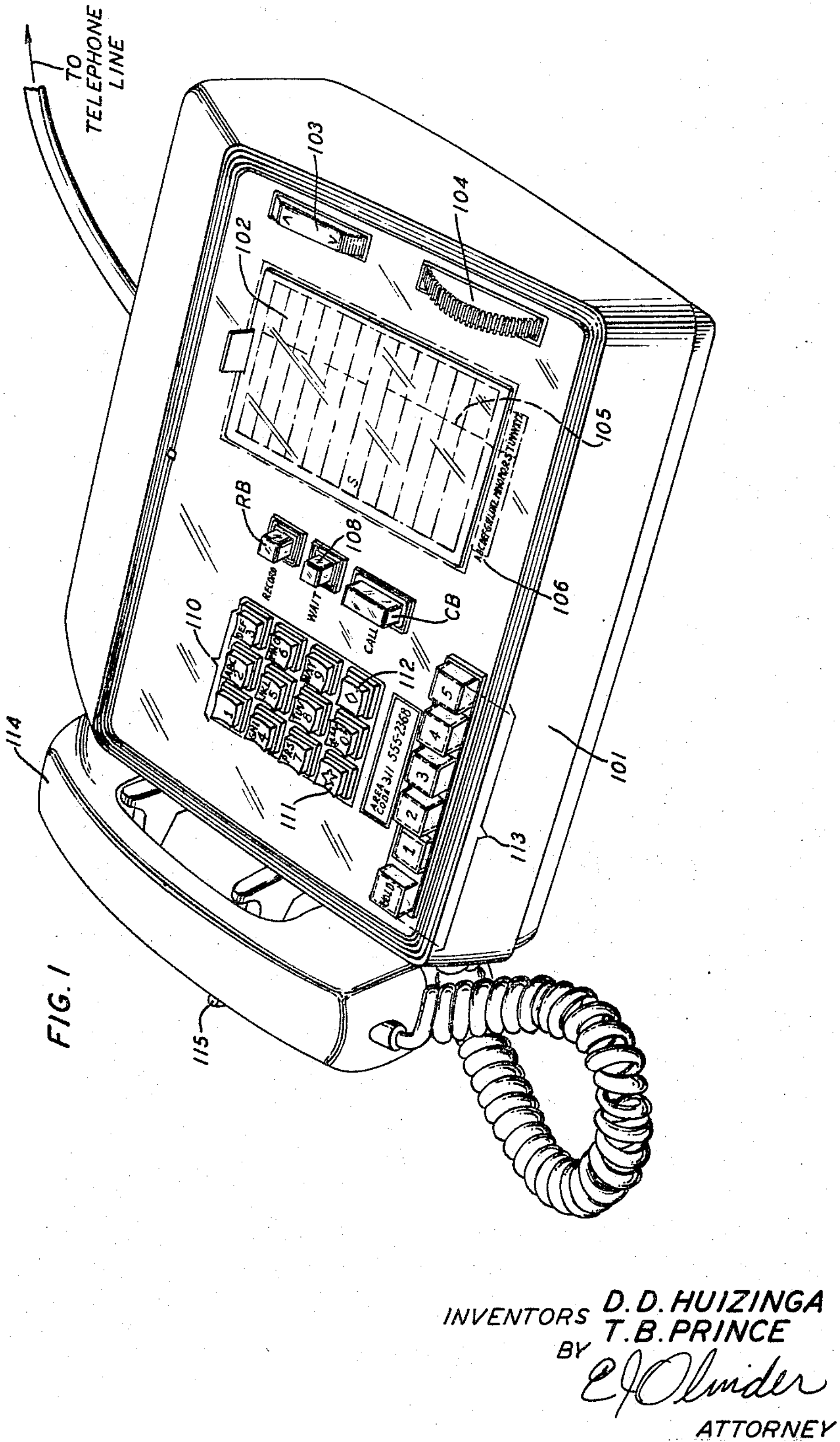
FIG. 1 is a front perspective view of a repertory dialer in accordance with the invention.

The elements of a repertory dialer in accordance with the invention may be advantageously housed in the manner shown in FIG. 1. The housing 101 is basically rectangular in cross section and provides a slanted face portion for the mounting of a substantially conventional pushbutton or TOUCH-TONE dial 110 which may include auxiliary buttons 111 and 112. Auxiliary buttons 111 and 112 may advantageously be employed for any of a number of special functions which may include, for example, the transmission of recorded data other than directory numbers and the establishment of special call priorities. RECORD button RB is used to initiate the RECORD mode of operation and CALL button CB is used to initiate the CALL mode of operation. WAIT button 108 is provided to enable the proper handling of a call that involves an intermediate dial tone. Names corresponding to the recorded directory numbers are displayed on index display panel 102. As the display panel is moved longitudinally in the process of locating a particular name, index locator line 105 moves horizontally to indicate a corresponding letter in alphabet indicator strip 106. Both the display panel 102 and the recording tape 201 (shown in FIGS. 2, 3 and 4) may be moved rapidly in either the forward or the reverse direction by energizing a power drive through a two-position rocker switch 103. Manual means for fine adjustment of the index position is provide a manual selector knob 104.

Any one of a variety of tape and index panel driving means that are known in the art may be employed in a repertory dialer embodying the principles of the invention. The means shown in FIG. 1 are presented herein in outline form only inasmuch as they form no part of the invention.

Figure 2:
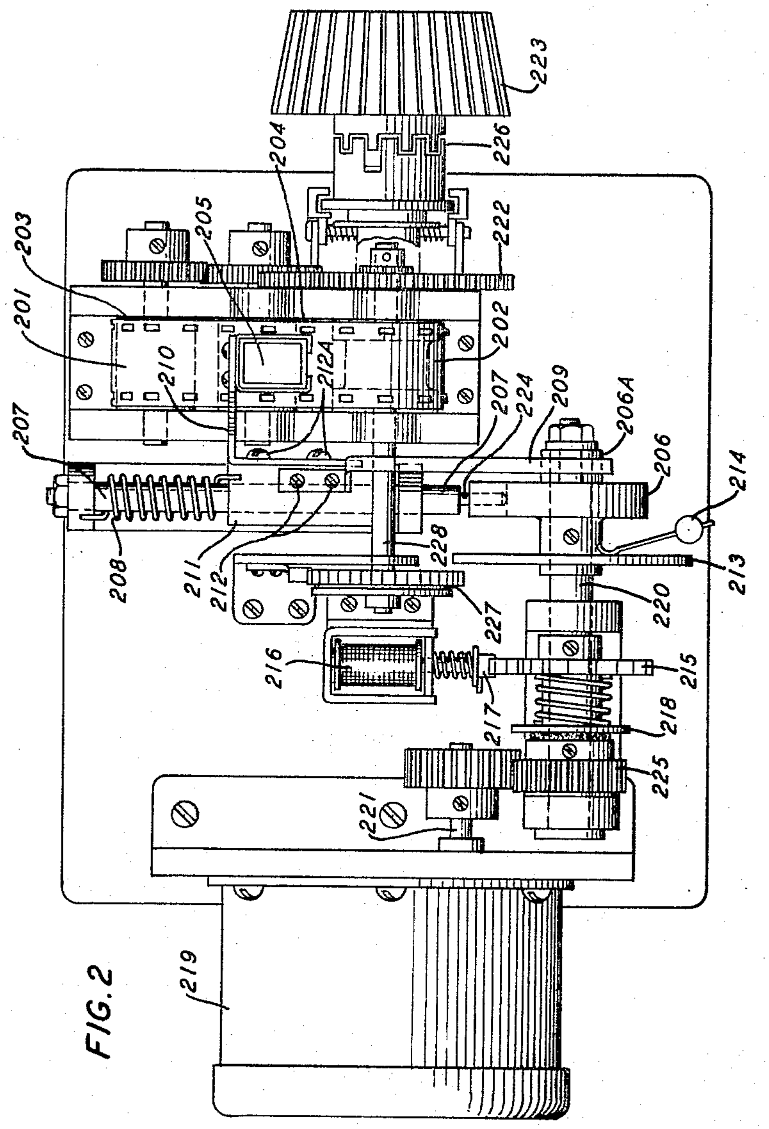
FIG. 2 is a mechanical schematic diagram of the drive mechanisms for controlling the magnetic tape and the head of the repertory dialer shown in FIG. 1.
Figure 3:
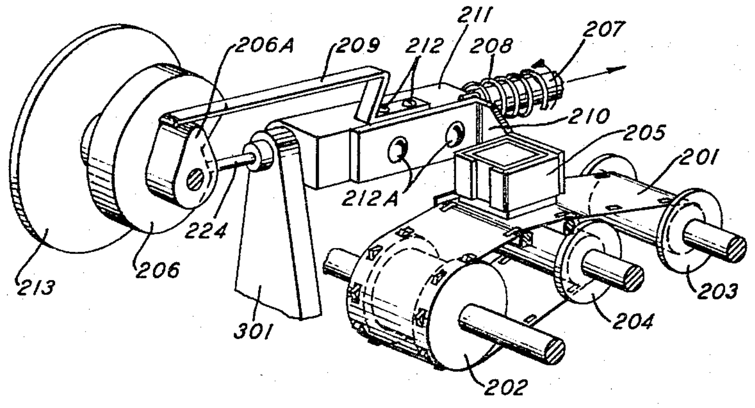
FIG. 3 is a detailed mechanical schematic diagram of a portion of the head control mechanism shown in FIG. 2.

The mechanical unit shown in FIG. 2 provides the power and the mechanisms required to move a RECORD-REPRODUCE head 205 relative to a magnetic tape 201. A mechanism for driving the tape with respect to the head includes manual selector knob 223, clutch 226 and gear train 222. Index display means, not shown in FIG. 2, may be driving couple with gear train 222 in a manner similar to that illustrated in application Ser. No. 202,653, filed June 14, 1962 by R. A. Miller and C. M. Taris.

The mechanical unit of FIG. 2 further includes a motor 219, with motor shaft 221 which drives a main shaft 220 through gear train 225 and slip clutch 218. The motion of main shaft 220 is controlled by a latch 217 which engages and disengages ratchet 215 in response to the operation of solenoid 216. Rotation of shaft 220 is converted by cam 206 to linear motion of slide shaft 207. A four-track magnetic head 205 is linked to a head carriage 211 by means of head support arm 210 which is affixed to carriage 211 by fasteners 212A. Head carriage 211 is free to rotate about slide shaft 207 but is affixed thereto for common longitudinal movement.

A portion of the head drive described above may be seen in greater detail in FIG. 3. Slide shaft 207 terminates in a cam follower portion 224 which is driven by cam 206 which results in head 205 traveling at a constant velocity over tape 201. A second portion 206A of the operating surface of cam 206 controls the operation of head return lift-off arm 209. Arm 209 is affixed to head carriage 211 by fasteners 212. In accordance with the invention, when the portion of the operating cycle is reached that calls for a return movement of the head to an initial or index position, the high portion of cam surface 206A engages head return lift-off arm 209 which serves to rotate head carriage 211 in a counterclockwise direction around shaft 207, as seen from the cam follower 224 end. Head 205 is thus lifted clear of tape 201 during the entire return movement of head 205 which, in accordance with the invention, occurs as a single uninterrupted step, assisted by action of spring 208. The continuous or uninterrupted return action described is in contrast to the ratchet or stepping action of the head which which is utilized for moving the head forward in relation to the tape in the RECORD mode of operation.

The tape mechanism shown in FIG. 2 is a separate unit comprising a tape sprocket 202, which is turned through gear linkages 222 by selector knob 223, and tape storage drums 203 and 204 which are connected through torsion springs (not shown) to shafts which are in turn interconnected by gears 222. A ratchet-like drive for the tape mechanism is provided by ratchet wheel 227. Each of the two storage drums 203 and 204 is fastened to a corresponding gear in gear train 222. During assembly, excess tape is wound on drum 203 and the torsion spring (not shown) is wound by rotation of the corresponding drum shaft. The interlocking gears are then locked to their corresponding shafts and sprocket 202 rotates until an equilibrium force is reached between the gears. This equilibrium results in equal torques being applied to the storage drums and therefore equal tension on tape 201 on either side of sprocket 202. When the sprocket 202 is turned to move tape 201, the equilibrium is broken, causing one of the storage drums 203 or 204 to drive the other and wind on tape 201.

Figure 5:
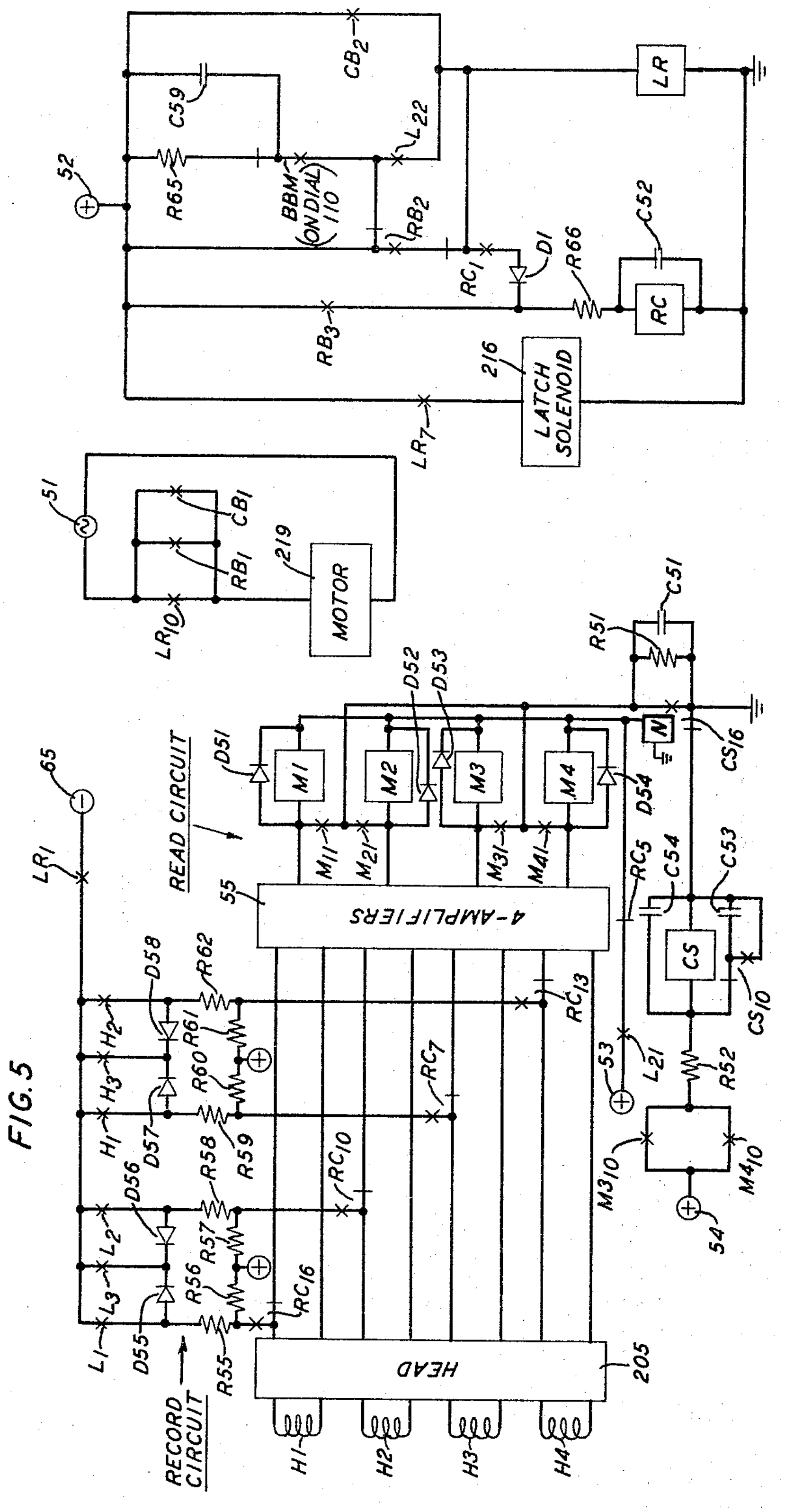
FIG. 5 is a schematic circuit diagram of the logic control circuitry employed in the repertory dialer shown in the foregoing figures.

The sequence of most of the operational steps described above is controlled by various switches, illustrated diagrammatically by switch 214. These switches are controlled by the logic imprinted on the face of a code disk 213 in terms of a pattern of conducting and nonconducting areas. A general illustration of the logic circuitry, including details of logic switches 214, drive circuitry and signal generating circuitry of a repertory dialer in accordance with the invention is shown in FIG. 5. The circuitry shown in FIG. 5 is abbreviated to a large extent, all parts not essential to an understanding of the invention being omitted for the sake of clarity and brevity. More detailed circuitry, particularly circuitry relating to the TOUCH-TONE dial and to the decoding and encoding arrangements, have previously been disclosed and are shown, for example, in application Ser. No. 228,581, filed by R. A. Miller and C. M. Taris on Oct. 5, 1962.

*General*

Figure 4:
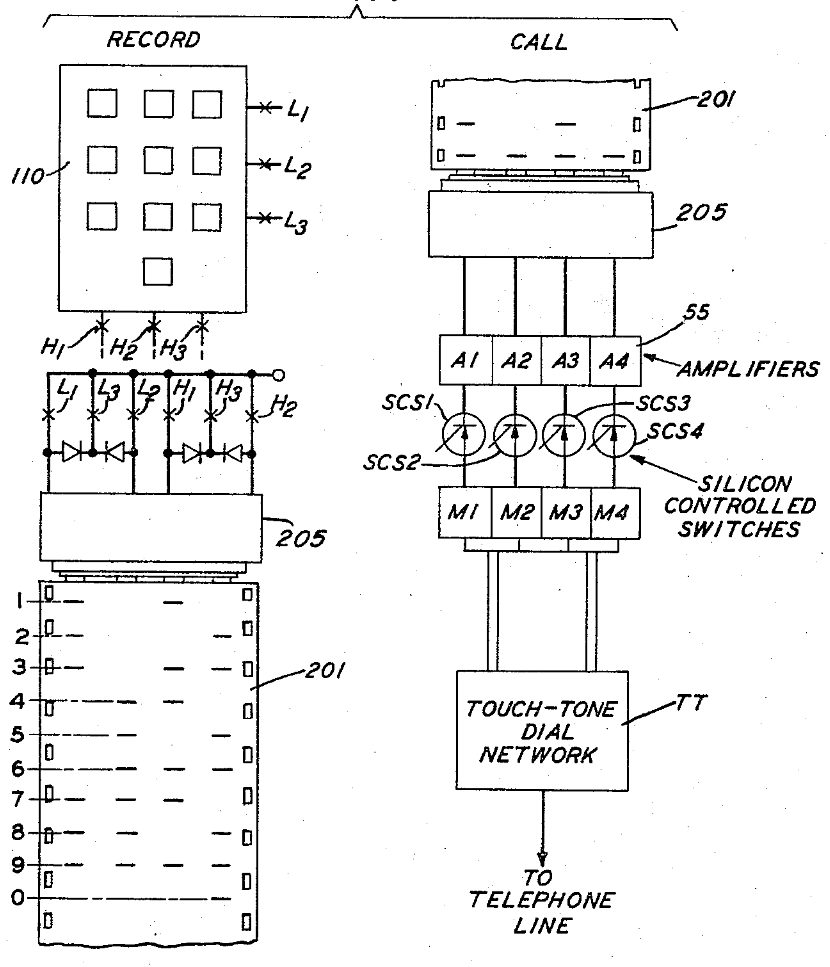
FIG. 4 is a combination functional block diagram and schematic circuit diagram showing in particular the sequence of the major steps in both the RECORD and CALL modes of operation.

As a preface to a detailed discussion of the circuitry shown in FIG. 5, attention is directed to FIG. 4, illustrating the general scheme of encoding and recording, which is similar to that described by Miller and Taris in the application cited immediately above. Operation of a digit designating button in pushbutton dial array 110 effects the closure of an L-switch and an H-switch which is translated into a modified binary code signal that is recorded on tape 201. The recording of the signal indicia for each digit is made transversely across the tape in terms of a D-C pulse or no pulse in each of the four available channels. In the CALL cycle, as shown in FIG. 4, the four-channel information is amplified by amplifiers 55 (A1 through A4), applied to silicon control switches SCS1 through SCS4 and matrix relays M1 through M4 to operate TOUCH-TONE dial network TT which generates conventional dual-tone multifrequency signals for application to a telephone line. In this fashion the modified binary code employed for recording is translated back into the conventional two-out-of-seven (or $3\times4$) code for multifrequency signal transmission.

*Details of RECORD cycle*

With reference to FIG. 5, a RECORD cycle is initiated by the operation of RECORD button RB. Motor 219 operates from A-C source 51 over a path which includes make contact $RB_1$. Relay LR (a logic relay) operates over make contact $RB_2$ and break contact $RC_1$. Relay RC operates, delayed by the time constant introduced by resistor R66 and capacitor C52, through make contact $RB_3$.

With relay LR operated, latch solenoid 216 operates through make contact $LR_7$ and voltage is applied to the RECORD circuit through make contact $LR_1$. With latch solenoid 216 released, latch 217 releases ratchet 215 and head 205 is put in motion in the manner described above in connection with the discussion of FIG. 2. When relay RC operates, head 205, which includes four separate transducers H1 through H4, is connected to the RECORD-ERASE circuit through make contacts $RC_{16}$, $RC_{10}$, $RC_7$ and $RC_{13}$. Each of the four amplifiers included in amplifier block 55 is disconnected by a corresponding one of the RC break contacts, $RC_{16-10-7-13}$. The make contact of limit switch $L_{22}$, which is shown schematically as switch 214 in FIG. 2, closes on code disk 213 (FIG. 2) to provide a path for future operations of relay LR. When relay LR releases, latch solenoid 216 releases since its operating path is opened by the release of make contact $LR_7$. The voltage path to the RECORD circuit is opened by the release of make contact $LR_1$.

When a button on dial 110 is depressed, one H-contact and one L-contact is closed to establish a code, as described in detail by Miller and Taris in the application cited above. Transfer contacts BBM on dial 110 are also operated by the depression of any button on dial 110. With transfer contacts BBM operated, relay LR operates for a preselected period such as 50 milliseconds, for example, and a digit is recorded through make contact $LR_1$ and one or more selected L-contacts, H-contacts and RC contacts, establishing a path to one or more of the head transducers H1 through H4. Head 205 is stepped to the next position for the next succeeding digit by the operation of latch solenoid 216 through make contact $LR_7$.

The steps described immediately above, which occur following the operation of a dial digit pushbutton, are repeated for each digit recorded. If the number recorded fills the maximum recording capacity for a single directory number, i.e., 14 digits, operation is as follows: Relay LR operates as described, to record the 14th digit. Head 205, under the control of ratchet 215, is stepped to an index position by latch solenoid 216 and ratchet latch 217 through the operation of make contact $LR_7$. Limit switch $L_{22}$ opens under the control of code disk 213 and relay LR becomes inoperative. With RECORD button RB released, relay RC releases, since make contact $RB_2$ is opened and motor 219 is stopped by the opening of make contact $RB_1$. The release of relay RC transfers head 205 to the read circuit by the release of RC transfer contacts $RC_{16-10-7-13}$.

If less than 14 digits are recorded for a particular directory number and RECORD button RB is released, relay LR operates through break contact $RB_2$ and limit switch $L_{22}$. Relay RC remains operated through break contact $RB_2$ and limit switch contact $L_{22}$ and make contact $RC_1$. Relay LR operated keeps motor 219 operating over make contact $LR_{10}$ and latch solenoid 216 operates over make contact $LR_7$. Latch solenoid 216 rotates code disk 213, cam 206 and ratchet 215, opening limit switch make contact $L_{22}$, releasing relays LR and RC. The release of relay LR releases latch solenoid 216 by the opening of make contact $LR_7$ and motor 219 is stopped when its operating path is opened by the release of make contact $CR_{10}$. With latch solenoid 216 released, latch 215 is engaged at its index position.

*Details of CALL mode of operation*

When CALL button CB is operated, motor 219 starts through make contact $CB_1$ and relay LR operates through make contact $CB_2$, limit switch make contact $L_{22}$ is operated by code disk 213, keeping relay LR operated through break contact $RB_2$. Relay LR operated keeps motor 219 operated through make contact $LR_{10}$, latch solenoid 216 operates over make contact $LR_7$ and all common switch functions of TOUCH-TONE dial TT, except excitation, are performed. Latch solenoid 216 operated releases ratchet latch 217 and ratchet 215 to place head 205 in motion.

Limit switch make contact $L_{21}$ is closed by rotation of code disk 213 and voltage is applied to matrix relays M1 through M4 and break contact $RC_5$. One or more of the silicon control switches SCS1 through 4 is operated by the recorded signal or signals amplified by one or more of the amplifiers A1 through A4 (see FIG. 4). Thus, one or more of the matrix relays M1 through M4 is operated to ground. Network N which may comprise a simple series combination of a resistance and capacitor provides a discharge path to ground for any potentially disturbing transient.

The modified binary code in which digits are recorded on tape 201 is translated into the conventional TOUCH-TONE or dual-tone multifrequency code by the particular combination of operated contacts on matrix relays M1 through M4. Relay CS (common switch relay) operates through make contact $M3_{10}$ or through make contact $M4_{10}$ and break contact $CS_{10}$ to ground. The RC network comprising resistor R51 and capacitor C51 holds the matrix relay or relays operated during the preselected period, which may be 50 milliseconds, for example, through operated ones of make contacts M11–21–31–41 and through make contact $CS_{16}$. Relay CS is self-releasing through the operation of break contacts $CS_{16}$. Limit switch make contact $L_{21}$ opens through code disk 213 (FIG. 2) which removes voltage from matrix relays M1 through M4. Limit switch $L_{22}$ on code disk 213 opens to break the operating path for relay LR and relay LR releases. Relay LR released releases latch solenoid 216 by the opening of make contact $LR_7$ and stops motor 219 by the opening of make contact $LR_{10}$. With latch solenoid 216 released, the unit stops on its index position.

It is to be understood that the embodiment described herein is merely illustrative of the principles of the invention. Various embodiments may be effected by persons skilled in the art without departing from the spirit and scope of the invention.

What is claimed is:

1. A repertory dialer comprising, in combination, magnetic storage means, a RECORD-REPRODUCE head, first means for initiating a RECORD mode of operation, second means for initiating a CALL mode of operation, manually operable means for establishing relative movement between said head and said storage means only in a first direction or in a second direction opposite to said first direction, thereby to establish a relative index position between said head and said storage means, means responsive to the operation of either said first or said second means for establishing relative movement between said head and said storage means in said first direction only, and means automatically operative upon the completion of a preselected duration of said last named movement for establishing relative movement between said head and said storage means in said second direction only, thereby to reset said dialer automatically to said index position.

2. In a telephone repertory dialer, in combination, means for generating multifrequency signal indicia of directory numbers, means for translating said indicia into D-C signals indicative of corresponding ones of said directory numbers in terms of a binary type code, a magnetic recording medium, a magnetic transducer, means for effecting relative movement between said medium and said transducer only in a single direction and in a reverse direction, and means including said medium and said transducer for recording successive groups of said D-C signals, all of said groups being disposed in linear succession along a common line in said single direction, whereby said transducer and said medium may be positioned with respect to each other to a relative position corresponding to any preselected one of said groups of recorded D-C signals by means of said relative movement only in said single direction or in said reverse direction.

3. In a telephone repertory dialer, in combination, means for generating multifrequency signal indicia of directory numbers, means for translating said indicia into D-C signals indicative of corresponding ones of said directory numbers in terms of a binary type code, means including a magnetic recording medium in the form of a relatively long and narrow tape and a magnetic transducer for recording said D-C signals longitudinally on said tape, means for effecting relative movement between said transducer and said tape longitudinally only with respect to said tape, whereby said transducer and said tape may be positioned with respect to each other to a relative position corresponding to the magnetically recorded indicia of a preselected recorded number, and means for extracting said last named indicia from said tape in the CALL mode of said dialer, said last named means including said means for effecting relative movement.

4. Apparatus in accordance with claim 3 wherein said means for effecting relative movement includes means for effecting a step or incremental movement corresponding to the recording of each separate digit of a directory number and a continuous uninterrupted movement for the extraction of a full directory number in said CALL mode.

5. Apparatus in accordance with claim 3 wherein said means for effecting relative movement includes means fixing the relative distance traveled between said tape and said transducer during said last named movement to an invariable distance irrespective of a varying number of digits in said recorded directory numbers.

6. In a telephone repertory dialer, in combination, a pushbutton dialing mechanism for generating a distinctive multifrequency signal in response to the operation of each pushbutton, means for translating each of said signals into one or more D-C signals in accordance with a preselected code, means including magnetic tape and a transducer head for recording said signals on said tape, means for reconverting recorded ones of said signals into multifrequency signals during an automatic dialing or CALL mode, said last named means including means for effecting a relative movement over a fixed distance between said head and said tape, said last named movement being longitudinal with respect to said tape, and means for moving said tape longitudinally with respect to said head to attain a relative position between said tape and said head corresponding to a particular recorded one of said signals.

7. In a telephone repertory dialer, in combination, a pushbutton dialing mechanism for generating a distinctive multifrequency signal in response to the operation of each pushbutton, means for translating each of said signals into a pattern of one or more D-C signals in accordance with a preselected code, means including magnetic tape and a transducer head for recording each of said patterns transversely across said tape, each of said patterns being displaced longitudinally only along said tape from all others of said patterns, means operative during the recording of said patterns for effecting a relative stepping motion between said head and said tape, each step corresponding to the recording of a particular one of said patterns, means for reconverting recorded ones of said patterns into multifrequency signals during an automatic dialing or CALL mode of operation, said last named means including means for effecting a continuous uninterrupted relative movement between said tape and said head, said last named movement being longitudinal with respect to said tape, said last named movement having a fixed duration and distance corresponding to a fixed longitudinal distance along said tape irrespective of the number of said patterns employed to represent a particular directory number.

8. In a telephone repertory dialer, in combination, a plurality of pushbuttons each corresponding to a particular digit, means responsive to the operation of each of said pushbuttons for generating a distinctive multifrequency signal, means for translating each of said signals into a pattern of one or more D-C signals in accordance with a preselected code, means including magnetic tape and a transducer head for recording each of said patterns transversely across said tape, each of said patterns being displaced longitudinally only along said tape from all others of said patterns, means operative during the recording of a group of said patterns corresponding to a directory number for stepping said head longitudinally along said tape, each step corresponding to the recording of one of the patterns in said group plus an unrecorded space, means operative after the recording of one of said groups for returning said head to an index position corresponding to the inception of the recording of said last named group, means operative during the reading out or CALL mode of operation of said dialer for driving said head uninterruptedly and continuously longitudinally over a preselected portion of said tape, said portion being of a common fixed length irrespective of the number of said patterns in any corresponding one of said groups, and means for driving said tape longitudinally with respect to said head to position the inception of a preselected one of said groups in juxtaposition to said head.

9. Apparatus in accordance with claim 8 wherein said returning means includes means for lifting said head clear of said tape thereby to minimize wear of said tape.

10. Apparatus in accordance with claim 8 wherein said stepping means comprises a motor, a shaft driven by said motor, a ratchet wheel driven by said shaft, a clutch connecting said shaft with said ratchet wheel, a slide mechanism supporting said head, a rod member drivingly coupled to said slide, and means including a cam driven by said shaft for translating rotary movement of said shaft into linear movement of said rod, slide and head.

No references cited.

KATHLEEN H. CLAFFY, *Primary Examiner.*

A. H. GESS, *Assistant Examiner.*